US010507608B2

(12) United States Patent
Lamberts et al.

(10) Patent No.: US 10,507,608 B2
(45) Date of Patent: Dec. 17, 2019

(54) POLYAMIDE MOULDING COMPOUNDS FOR LARGE MOULDED PARTS

(71) Applicant: EMS-PATENT AG, Domat/Ems (CH)

(72) Inventors: Nikolai Lamberts, Bonaduz (CH); Bernd Henkelmann, Bonaduz (CH); Philipp Harder, Chur (CH)

(73) Assignee: EMS-PATENT AG, Domat/Ems (CH)

( * ) Notice: Subject to any disclaimer, the term of this patent is extended or adjusted under 35 U.S.C. 154(b) by 514 days.

(21) Appl. No.: 15/035,829

(22) PCT Filed: Nov. 12, 2014

(86) PCT No.: PCT/EP2014/074313
§ 371 (c)(1),
(2) Date: May 11, 2016

(87) PCT Pub. No.: WO2015/071281
PCT Pub. Date: May 21, 2015

(65) Prior Publication Data
US 2016/0297120 A1    Oct. 13, 2016

(30) Foreign Application Priority Data

Nov. 14, 2013 (CH) ...................................... 1902/13

(51) Int. Cl.
| | | |
|---|---|---|
| *C08K 3/04* | (2006.01) | |
| *C08L 77/06* | (2006.01) | |
| *B29C 45/00* | (2006.01) | |
| *C08L 53/02* | (2006.01) | |
| *C08G 69/26* | (2006.01) | |
| *C08K 7/06* | (2006.01) | |
| *C08L 23/08* | (2006.01) | |
| *C08L 51/04* | (2006.01) | |
| *C08L 51/06* | (2006.01) | |
| *B29K 77/00* | (2006.01) | |
| *B29K 105/00* | (2006.01) | |
| *B29K 105/12* | (2006.01) | |
| *B29K 307/04* | (2006.01) | |

(52) U.S. Cl.
CPC ........ *B29C 45/0001* (2013.01); *C08G 69/265* (2013.01); *C08K 7/06* (2013.01); *C08L 23/0884* (2013.01); *C08L 51/04* (2013.01); *C08L 51/06* (2013.01); *C08L 77/06* (2013.01); *B29K 2077/00* (2013.01); *B29K 2105/0005* (2013.01); *B29K 2105/0085* (2013.01); *B29K 2105/12* (2013.01); *B29K 2307/04* (2013.01); *B29K 2995/0012* (2013.01)

(58) Field of Classification Search
None
See application file for complete search history.

(56) References Cited

U.S. PATENT DOCUMENTS

| | | | | | |
|---|---|---|---|---|---|
| 3,745,104 | A * | 7/1973 | Hou | ........................ | D01F 11/15 |
| | | | | | 204/164 |
| 5,360,888 | A * | 11/1994 | Ullrich | ..................... | C08L 77/00 |
| | | | | | 524/195 |
| 7,999,018 | B2 * | 8/2011 | Saga | ........................ | C08K 7/06 |
| | | | | | 524/35 |
| 9,862,827 | B2 * | 1/2018 | Bayer | ..................... | C08L 77/06 |
| 2003/0199607 | A1 * | 10/2003 | Cheng | ..................... | C08K 7/06 |
| | | | | | 523/137 |
| 2004/0266916 | A1 * | 12/2004 | Harashina | .............. | C08K 3/016 |
| | | | | | 523/217 |
| 2008/0194751 | A1 | 8/2008 | Rexin et al. | | |
| 2010/0120972 | A1 | 5/2010 | Yuan | | |
| 2013/0338261 | A1 * | 12/2013 | Center | ................... | C08K 5/175 |
| | | | | | 523/351 |

FOREIGN PATENT DOCUMENTS

| | | |
|---|---|---|
| EP | 0 477 027 A2 | 3/1992 |
| EP | 1 860 134 A1 | 11/2007 |
| EP | 1 961 787 A1 | 8/2008 |
| EP | 1 971 642 | 9/2008 |
| EP | 2719928 A1 | 4/2014 |
| WO | 00/78869 A1 | 12/2000 |
| WO | 2007/061965 A1 | 5/2007 |

OTHER PUBLICATIONS

International Preliminary Report on Patentability dated May 26, 2016 from the International Bureau in counterpart International Application No. PCT/EP2014/074313.
International Search Report of PCT/EP2014/074313 dated Feb. 24, 2015.

* cited by examiner

*Primary Examiner* — Tae H Yoon
(74) *Attorney, Agent, or Firm* — Sughrue Mion, PLLC

(57) ABSTRACT

The invention concerns polyamide moulding compound, in particular for producing heat-resistant moulded parts, having the following composition: (A) 20 to 79 wt. % of at least one partially aromatic polyamide in the form of a copolyamide which comprises 50 to 80 mol. % units formed by hexanediamine and terephthalic acid; (B) 1 to 15 wt. % of at least one impact-resistant modifier; (C) 20 to 60 wt. % of at least one carbon fibre; and (D) 0 to 5 wt. % of at least one additive, components (A) to (D) adding up to 100 wt. %.

36 Claims, No Drawings

POLYAMIDE MOULDING COMPOUNDS FOR LARGE MOULDED PARTS

CROSS REFERENCE TO RELATED APPLICATIONS

This is a National Stage of International Application No. PCT/EP2014/074313 filed Nov. 12, 2014, claiming priority based on Swiss Patent Application No. 01902/13 filed Nov. 14, 2013, the contents of all of which are incorporated herein by reference in their entirety.

TECHNICAL FIELD

The present invention relates to carbon-fiber-reinforced polyamide molding compositions for the production in particular of large moldings which require small demolding forces, and low injection pressures, and have high strength. It further relates to processes for the production of the polyamide molding compositions, processes for the production of said large moldings and components made from these, and to uses of these polyamide molding compositions and, respectively, components.

PRIOR ART

EP-A-0 477 027 discloses polyamide molding compositions which have improved impact resistance and which are based on a crystalline semiaromatic polyamide having at least 50 mol % of terephthalic acid blocks and on functionalized block copolymers as impact modifier. The molding compositions are also intended to be suitable for high-temperature applications, e.g. for automobile components. The stated systems are based on 6T/6I and 6T/6I/66 with different proportions of impact modifier in the range from 2 to 25 parts by weight, based on total weight. Reinforcement systems are described in general terms and possible systems are stated in lists, but are not used.

WO-A-00/78869 discloses impact-modified, semiaromatic high-temperature polyamides for injection-molding applications with copper halide heat stabilizers. Here again, systems based on 6T/6I/66 in various proportions are proposed, and the proportion of impact modifier is in the range from 5 to 50% by weight, based on total weight. It is moreover said that up to 60% of additives, inter alia fillers, can be present. 6T/6I/66 is used, and the examples use additives in the form of color pigments in proportions of 1.2 parts by weight, based on total weight, and respectively chopped glass in proportions of 33 parts by weight, based on total weight.

EP-A-1 971 642 discloses a carbon-fiber-reinforced polyamide composition with a polycarbodiimide as other essential constituent. A wide variety of aliphatic, aromatic, and semiaromatic polyamides are described as possible polyamides, preference being given here to polyamide 66. The proportion of carbon fibers is in the range from 5 to 20%, and the quantity used is also from 5 to 20%. Use of an impact modifier is moreover described as an option, and specifically in proportions of from 2 to 29.7 parts by weight. The examples, all of which use PA66, use an impact modifier, and specifically in a proportion of 10%, always based on total weight.

US-A-2010120972 discloses a thermoplastic composite composition which comprises at least one semiaromatic polyamide, a surface-treated carbon fiber with an aromatic size, and also optionally from 0 to about 25% by weight of PTFE.

EP-A-1 860 134 discloses a semiaromatic polyamide resin which has high residence stability, hot-water resistance, and chemical resistance, and also excellent adhesion properties and compatibility with other resins and the like. The semiaromatic polyamide resin is based on from 50 to 100 mol % of aromatic dicarboxylic acid units and from 60 to 100 mol % of the aliphatic diamine units having from 9 to 13 carbon atoms. At least 10% of the terminal groups of the molecular chains of the polyamide resin moreover are blocked by a terminal-group-blocking agent.

DESCRIPTION OF THE INVENTION

An undesirable characteristic of the molding compositions of the prior art is inter alia the fact that, in particular in the use for large components, they cause problems in the injection-molding process: the demolding force that has to be exerted for these molding compositions can assume values that lead to production problems. It has not hitherto been possible to find the solution to this problem without adopting measures that also led to impairment of the mechanical properties of the components. This is where the present invention intervenes.

The invention accordingly relates to polyamide molding components as claimed in claim 1 and respectively processes for production thereof, and in particular it also relates to use thereof for the production of large moldings by injection-molding processes. The molding compositions proposed are composed of at least one semiaromatic polyamide with at least one impact modifier, at least one carbon fiber, and optionally other additives.

A feature of the molding compositions proposed is inter alia and in particular a low demolding force when they are used for the production of moldings in injection-molding machines. If a critical value for the demolding force is exceeded, it becomes impossible to avoid damage to the injection moldings when they are removed from the mold. This is important particularly for injection moldings of particularly large size, i.e. in particular for moldings with, for example, a shot volume of from 500 to 10 000 ml and more preferably by way of example with a surface area of from more than 500 to 10 000 $cm^2$ in contact with the injection mold in the parting surface.

Specifically, the present invention provides a polyamide molding composition with the following composition:

(A) from 20 to 79% by weight of at least one semiaromatic polyamide preferably in the form of a copolyamide which comprises from 50 to 80 mol % of units composed of hexanediamine and terephthalic acid, (B) from 1 to 15% by weight of at least one impact modifier, (C) from 20 to 60% by weight of at least one carbon fiber, (D) from 0 to 5% by weight of at least one additive, where components (A) to (D) give a total of 100% by weight.

Surprisingly, results of this specific combination of the proportions of the various components (A)-(D) are found to be that the resultant polyamide molding composition can provide the thermomechanical properties required for the final applications, in particular in the production of large moldings, for example for high-temperature applications in the automobile sector, while simultaneously also avoiding problems in the injection mold; in particular it is found that a very low demolding force can be achieved.

The proportion of component (A) in the molding composition here is preferably in the range from 30 to 70% by weight, or from 35 to 65% by weight, and with particular preference in the range from 40 to 60% by weight.

In a first preferred embodiment, said polyamide molding composition is characterized in that component (A) is a copolyamide which comprises from 50 to 80 mol %, preferably from 60 to 75 mol %, and with particular preference from 65 to 73 mol %, of units composed of hexanediamine and terephthalic acid. It is preferable that the material is a semicrystalline polyamide, preferably with glass transition temperature (Tg) at least 100° C., with preference at least 115° C., and/or with melting point at least 250° C., preferably at least 260 or at least 270° C., in particular in the range from 250 to 330° C., in particular in the range from 260 to 320° C., and/or with enthalpy of fusion at least 30 J/g, with preference at least 35 J/g, and with particular preference at least 40 J/g. It is preferable that the molding composition is free from amorphous polyamides.

Component (A) can therefore preferably be a polyamide of the general 6T/xx type, and by way of example it is possible to use systems having the general structure 6T/61, 6T/10T, 6T/12T, 6T/10I, 6T/12I 6T/66, 6T/610, 6T/612, etc., or else systems by way of example of the 6T/6I/66 type. It is preferable that component (A) comprises no polyamide of the general 6T/D6 type, and/or of the general 6T/DT type, where D represents the diamine unit 2-methyl-1,5-pentanediamine Other possible systems are based on lactams or aminocarboxylic acids alongside the 6T fraction, examples being systems of the 6T/6, 6T/10, 6T/12 type, etc. However, it is preferable here that the copolyamide is in essence free from aliphatic diacids and/or free from aliphatic lactams and/or aminocarboxylic acids; with particular preference it is free of adipic acid. It is further preferable that the material is a copolyamide which is based exclusively on an aliphatic diamine or on a plurality of different aliphatic diamines, preferably based on unbranched aliphatic diamines having from 4 to 14 carbon atoms, preferably 6, 8, 10, and/or 12 carbon atoms. It is particularly preferably exclusively based on a single, preferably unbranched aliphatic diamine, in particular hexanediamine, octanediamine, decanediamine, or dodecanediamine In other words preference is given to systems of the 6T/6I, 6T/10T, 6T/12T, 6T/10I, 6T/12I type.

It is preferable that component (A) is a 6T/6I copolyamide which comprises more than 50 mol %, preferably more than 60 mol %, and with particular preference more than 65 mol %, of 6T units.

The impact modifier used as component (B) is preferably selected from the following group: natural rubber, polybutadiene, polyisoprene, polyisobutylene, copolymers of butadiene and/or isoprene with styrene or with styrene derivatives and with other comonomers, hydrogenated copolymers, and/or copolymers produced via grafting or copolymerization with anhydrides, (meth)acrylic acid, and esters thereof, and mixtures of these systems. Component (B) can also be a graft rubber having a crosslinked elastomeric core which is preferably composed of butadiene, isoprene, or alkyl acrylates, and a graft shell preferably made of polystyrene, a nonpolar or polar olefin homo- or copolymer such as ethylene-propylene rubber, ethylene-propylene-diene rubber, or ethylene-octene rubber, or ethylene-vinyl acetate rubber, or a nonpolar or polar olefin homo- or copolymer obtained via grafting or copolymerization with anhydrides, (meth)acrylic acid, and esters thereof, or in turn a mixture of said systems. The impact modifier (B) can also be a carboxylic-acid-functionalized copolymer such as poly(ethene-co-(meth)acrylic acid) or poly(ethene-co-1-olefin-co-(meth) acrylic acid), where the 1-olefin can be an alkene or an unsaturated (meth)acrylic ester having more than 4 atoms, inclusive of those copolymers in which the acid groups have been neutralized to some extent with metal ions.

Other preferred impact modifiers based on styrene monomers (styrene and styrene derivatives) and on other vinylaromatic monomers are block copolymers composed of alkenylaromatic compounds and of a conjugated diene, and also hydrogenated block copolymers of an alkenylaromatic compound and of conjugated dienes and combinations of these types of impact modifier. The block copolymer preferably comprises at least one block derived from an alkenylaromatic compound (A) and at least one block derived from a conjugated diene (B). In the case of the hydrogenated block copolymers, the proportion of aliphatically unsaturated carbon-carbon double bonds can have been reduced via hydrogenation. Other block copolymers that can preferably be used are two-, three-, four-, and polyblock copolymers having linear structure. Branched and star-shaped structures can likewise be used. Branched block copolymers are obtained in a known manner, e.g. via graft reactions of polymeric "branches" onto a main polymer chain.

It is also possible to use, as alkenylaromatic monomers, alongside or in a mixture with styrene, and/or other vinylaromatic monomers which have substitution on the aromatic ring and/or at the C=C double bond by C1-20-hydrocarbon moieties or by halogen atoms.

Examples of alkenylaromatic monomers are styrene, p-methylstyrene, α-methylstyrene, ethylstyrene, tert-butylstyrene, vinyltoluene, 1,2-diphenylethylene, 1,1-diphenylethylene, vinylxylenes, vinyltoluenes, vinylnaphthalenes, divinylbenzenes, bromostyrenes, chlorostyrenes, and also combinations thereof. Preference is given to styrene, p-methyl-styrene, alpha-methylstyrene, and vinylnaphthalene.

It is preferable to use styrene, α-methylstyrene, p-methylstyrene, ethylstyrene, tert-butyl-styrene, vinyltoluene, 1,2-diphenylethylene, 1,1-diphenylethylene, or a mixture of these. It is particularly preferable to use styrene. It is also possible to use alkenylnaphthalenes.

Examples of diene monomers that can be used are 1,3-butadiene, 2-methyl-1,3-butadiene, 2,3-dimethyl-1,3-butadiene, 1,3-pentadiene, 1,3-hexadiene, isoprene, chloroprene, and piperylene. Preference is given to 1,3-butadiene and isoprene, in particular to 1,3-butadiene (hereinafter abbreviated to butadiene).

It is preferable to use styrene as alkenylaromatic monomer and butadiene as diene monomer, i.e. it is preferable that the block copolymer is a styrene-butadiene block copolymer. The block copolymers are generally produced via anionic polymerization in a manner known per se.

It is moreover possible to make concomitant use of other comonomers in addition to the styrene monomers and diene monomers. The proportion of the comonomers is preferably from 0 to 50% by weight, particularly preferably from 0 to 30% by weight, and in particular from 0 to 15% by weight, based on the total quantity of the monomers used. Examples of suitable comonomers are acrylates, in particular C1-12-alkyl acrylates such as n-butyl acrylate or 2-ethylhexyl acrylate, and the corresponding methacrylates, in particular C1-12-alkyl methacrylates such as in particular Methyl methacrylate (MMA). Other possible comonomers are (meth)acrylonitrile, glycidyl (meth)acrylate, vinyl methyl ether, diallyl and divinyl ethers of dihydric alcohols, divinylbenzene, and vinyl acetate.

The hydrogenated block copolymers optionally also comprise, in addition to the conjugated diene, fractions of lower hydrocarbons, e.g. ethylene, propylene, 1-butene, dicyclopentadiene, or nonconjugated dienes. The proportion of the unreduced aliphatic unsaturated bonds resulting from the block B in the hydrogenated block copolymers is smaller than 50%, preferably smaller than 25%, in particular smaller than 10%. The aromatic fractions from block A are reduced to an extent of at most 25%. The hydrogenated block copolymers styrene-(ethylene-butylene) two-block and styrene(ethylene-butylene)-styrene three-block copolymers are obtained via hydrogenation of styrene-butadiene copolymers and of styrene-butadiene-styrene copolymers.

The block copolymers are preferably composed of from 20 to 90% by weight of block A, in particular from 50 to 85% by weight of block A. The diene can be incorporated in 1,2- or 1,4- orientation into the block B.

The molar mass of the block copolymers is preferably from 5000 to 500 000 g/mol, with preference from 20 000 to 300 000 g/mol, in particular from 40 000 to 200 000 g/mol. Suitable hydrogenated block copolymers are the products obtainable commercially, e.g. KRATON® (Kraton Polymers) G1650, G1651, and G1652, and also TUFTEC® (Asahi Chemical) H1041, H1043, H1052, H1062, H1141, and H1272.

Examples of unhydrogenated block copolymers are polystyrene-polybutadiene, polystyrene-poly(ethylene-propylene), polystyrene-polyisoprene, poly($\alpha$-methylstyrene)-polybutadiene, polystyrene-polybutadiene-polystyrene (SBS), polystyrene-poly(ethylene-propylene)-polystyrene, polystyrene-polyisoprene-polystyrene, and poly($\alpha$-methylstyrene-polybutadiene-poly(oc-methylstyrene), and also combinations thereof.

Suitable unhydrogenated block copolymers which are available commercially are various products with trademarks SOLPRENE® (Phillips), KRATON® (Shell), VECTOR® (Dexco), and SEPTON® (Kuraray).

In another preferred embodiment, the molding compositions of the invention are characterized in that component (B) is a polyolefin homopolymer or an ethylene-$\alpha$-olefin copolymer, with particular preference an EP elastomer and/or EPDM elastomer (ethylene-propylene rubber and, respectively, ethylene-propylene-diene rubber): the material can by way of example be an elastomer based on an ethylene-$C_{3-12}$-$\alpha$-olefin copolymer with from 20 to 96% by weight, preferably from 25 to 85% by weight, of ethylene, and with particular preference to $C_{3-12}$-$\alpha$-olefin here is an olefin selected from the group of propene, 1-butene, 1-pentene, 1-hexene, 1-octene, 1-decene, and/or 1-dodecene, and combinations thereof, and with particular preference component (B) is ethylene-propylene rubber and/or LLDPE, and/or VLDPE.

As alternative or in addition (for example in a mixture), component (B) can be a terpolymer based on ethylene-$C_{3-12}$-$\alpha$-olefin with an unconjugated diene, where this preferably comprises from 25 to 85% by weight of ethylene and up to at most in the region of 10% by weight of an unconjugated diene, where with particular preference the $C_{3-12}$-$\alpha$-olefin is an olefin selected from the group of propene, 1-butene, 1-pentene, 1-hexene, 1-octene, 1-decene, and/or 1-dodecene, and combinations thereof, and/or where the unconjugated diene is preferably selected from the group of bicyclo[2.2.1]heptadiene, 1,4-hexadiene, dicyclopentadiene, and/or in particular 5-ethylidenenorbornene.

It is also possible moreover to use ethylene-acrylate copolymers for component (B). Other possible forms for component (B) are the ethylene-butylene copolymers and mixtures (blends) comprising these systems. It is preferable that component (B) has anhydride groups which are introduced via thermal or free-radical reaction of the main-chain polymer with an unsaturated dicarboxylic anhydride, an unsaturated dicarboxylic acid, or an unsaturated monoalkyl dicarboxylate, at a concentration sufficient for good linkage to the polyamide, reagents preferably used being selected from the following group: maleic acid, maleic anhydride, monobutyl maleate, fumaric acid, aconitic acid, itaconic anhydride, and combinations/mixtures thereof. It is preferable that from 0.1 to 4.0% by weight of an unsaturated anhydride is grafted onto impact-resistance components (B), or that the unsaturated dicarboxylic anhydride or precursor thereof is grafted together with another unsaturated monomer onto the material. It is generally preferable that the degree of grafting is in the range from 0.1 to 1.0%, with particular preference in the range from 0.3 to 0.7%. Another possibility as component (B) is a mixture of an ethylene-propylene copolymer with an ethylene-butylene copolymer, with a degree of malic anhydride grafting (degree of MAH grafting) in the range from 0.3 to 0.7%.

Component (B) can moreover have functional groups, e.g. carboxylic acid, ester, epoxy, oxazoline, carbodiimide, isocyanate, silanol, and carboxylate groups, or can have a combination of two or more of the functional groups mentioned. Monomers bearing these functional groups can be bonded to the elastomeric polyolefin via copolymerization or grafting.

The impact modifiers based on the olefin polymers can moreover also have been modified via grafting with an unsaturated silane compound, e.g. vinyltrimethoxysilane, vinyltriethoxysilane, vinyltriacetosilane, methacryloxypropyltrimethoxysilane, or propenyltrimethoxysilane. The elastomeric polyolefins are random, alternating, or segmented copolymers having linear, branched, or core-shell structure, and comprise functional groups which can react with the terminal groups of the polyamides, thus giving adequate compatibility between polyamide and impact modifiers.

The impact modifiers of the invention therefore include homopolymers and copolymers of olefins, e.g. ethylene, propylene, 1-butene, and copolymers of olefins with copolymerizable monomers, such as vinyl acetate, (meth)acrylic ester, and methylhexadiene.

Examples of crystalline olefin polymers are low-, medium-, and high-density polyethylenes, polypropylene, polybutadiene, poly-4-methylpentene, ethylene-propylene block and random copolymers, ethylene-methylhexadiene copolymers, propylene-methylhexadiene copolymers, ethylene-propylene-butene copolymers, ethylene-propylene-hexene copolymers, ethylene-propylene-methylhexadiene copolymers, poly(ethylene-vinyl acetate) (EVA), poly(ethylene-ethyl acrylate) (EEA), ethylene-octene copolymer, ethylene-butene copolymer, ethylene-hexene copolymer, ethylene-propylene-diene terpolymers, and also combinations of the polymers mentioned.

Examples of suitable commercially obtainable impact modifiers are the following:

TAFMER MC201: g-MAH (-0.6%) blend of 67% EP copolymer (20 mol % propylene) +33% EB copolymer (15 mol % 1-butene): Mitsui Chemicals, Japan.

TAFMER MH5010: g-MAH (-0.6%) ethylene-butylene copolymer; Mitsui.

TAFMER MH7010: g-MAH (-0.7%) ethylene-butylene copolymer; Mitsui.

TAFMER MH7020: g-MAH (-0.7%) EP copolymer, Mitsui.

EXXELOR VA1801: g-MAH (-0.7%) EP copolymer; ExxonMobil Chemical, US.

EXXELOR VA1803: g-MAH (0.5-0.9%) EP copolymer, amorphous, Exxon.

EXXELOR VA1810: g-MAH (-0.5%) EP copolymer, Exxon.
EXXELOR MDEX 94-1 1: g-MAH (0.7%) EPDM, Exxon.
FUSABOND MN493D: g-MAH (-0.5%) ethylene-octene copolymer, DuPont, US.
FUSABOND A EB560D (g-MAH) ethylene-n-butyl acrylate copolymer, DuPont.
ELVALOY, DuPont
Lotader AX 8840, Arkema, FR.

Preference is also given to an ionomer in which the polymer-bonded carboxy groups of the impact modifier have linkage to one another entirely or to some extent via metal ions. It is particularly preferable that the impact modifier (B) is a copolymer of ethylene and glycidyl methacrylate.

The possible systems stated above for component (B) can be used individually or else in mixtures of two or more different systems.

An advantage is generally found to be obtained when the quantity of component (B) present is from 3 to 15% by weight, preferably from 5 to 14% by weight, and with particular preference from 6 to 11% by weight.

In another preferred embodiment, the carbon fiber of component (C) can be a recyclate carbon fiber.

For the carbon fiber of component (C), preference is generally given to fibers of length from 0.1 to 50 mm and of diameter from 5 to 40 μm. It is preferable to use PAN-based, pitch-based, or cellulose-based fibers as bases for the carbon fibers; preference is in particular given to PAN fibers (PAN=polyacrylonitrile).

In one embodiment, the carbon fiber of component (C) can be in coated form, where the coating can in particular be selected from a coating material based on epoxy, polyurethane, polyimide, polyamide, or a mixture of these, where the weight of the coating preferably does not exceed 4% by weight, based on the weight of the carbon fiber. In one preferred embodiment, the coating of the carbon fiber of component (C) can be composed of a mixture or of a copolymer of at least one polyamide and of at least one epoxide. It is preferable that the proportion by weight of the polyamide is greater than the proportion by weight of the epoxide in the mixture or in the copolymer. It is particularly preferable that the proportion by weight of the polyamide is 67% by weight and that the proportion by weight of the epoxide is 33% by weight.

In another embodiment, the carbon fiber of component (C) can be uncoated, and in another preferred embodiment here the surface of the uncoated carbon fiber has been plasma-treated.

The proportion of the carbon fiber of component (C) in the polyamide molding composition is generally preferably more than 20% by weight, preferably from 25 to 60% by weight, with preference from 30 to 50% by weight, and with particular preference from 35 to 45% by weight.

In one preferred embodiment, the additives of component (D) are selected from the group consisting of: glass beads, glass fibers (with round or flat cross section), mineral powder, UV stabilizers, heat stabilizers, lubricant and mold-release agents, coloring and marking substances, inorganic pigments, organic pigments, IR absorber, antistatic agents, antiblocking agent, nucleating agent, crystallization accelerator, crystallization retarder, chain-extending additives, conductivity additives, crosslinking agent, flame retardant, intumescent agent, viscosity modifiers, foreign polymers, and/or mixtures thereof.

Within component (D) here, viscosity modifiers present can inter alia also be polycarbodiimides in a proportion of at most 1% by weight, but it is preferable that the polyamide molding composition is entirely free from polycarbodiimides.

Viscosity modifiers, and among these in particular polycarbodiimides, lead to an increase of molecular weight and thus to reduced flowability. Particularly in the case of large components where there are long flow paths in the hot runners of the injection mold, low flowability represents a problem.

The foreign polymers mentioned within component (D) are not be understood as comprising any impact modifiers in the sense of above component (B).

It is preferable that the proportion of the at least one additive of component (D) is in the range from 0.05 to 4% by weight, preferably from 0.1 to 2% by weight, and particularly preferably from 0.15 to 1% by weight.

A preferred molding composition of the present invention is constituted as follows:
(A) from 30 to 60% by weight of at least one semiaromatic polyamide, in particular of the 6T/6I type,
(B) from 4 to 11% by weight of at least one impact modifier,
(C) from 35 to 55% by weight of at least one carbon fiber,
(D) from 1 to 4% by weight of at least one additive,
where components (A) to (D) give a total of 100% by weight.

As explained above, a feature of the proposed molding composition is inter alia that the demolding force, in particular for large components, is unexpectedly small. A feature of another preferred embodiment is accordingly that the demolding force that has to be exerted in order to remove an injection molding produced as described in the experimental section from the proposed polyamide molding composition, measured for a beaker mold, is less than 3000 N, preferably less than 2000 N, and particularly preferably less than 1500 N. A feature of a preferred embodiment is that the demolding force for an injection molding produced as described in the experimental section from the proposed polyamide molding composition, determined for a beaker mold, is not more than 4 times, preferably not more than 3 times, and particularly preferably not more than twice, the demolding force for a composition made of 47.625% by weight of PA 6T/6I (molar ratio 70:30, melting point 325° C., rel. viscosity 1.58 [determined in accordance with ISO 307 at 0.5% in m-cresol at 20°C], 0.04% by weight water content, MVR 144 cm$^3$/10 min in accordance with
ISO1133, 340° C., at 21.6 kg), 50% by weight of glass fibers (round glass fibers of diameter 10 μm, average length 4.5 mm, with size made of 0.1% by weight, based on the total weight of the glass fiber, of a hydrolyzed aminosilane and 0.5% by weight, based on the total weight of the glass fiber, of one third of an aqueous polyurethane dispersion and two thirds of a polyfunctional (meth)acrylate oligomer in particular as obtainable with the name Vetrotrex 995 EC10-4.5), 0.2% by weight of kaolin, 0.175% by weight of a CuI/KI stabilizer system, and 2.0% by weight of a carbon black masterbatch based on PA66; this was produced under the conditions stated in the experimental section.

Demolding forces arising in the case of very large parts, as stated in the inventive uses, are significantly greater than in the case of the moldings described in the experimental section produced for test purposes.

The impact resistance of the proposed polyamide molding composition, determined in accordance with ISO 179-1, is preferably at least 35 kJ/m$^2$, with preference at least 45 kJ/m$^2$, and with particular preference at least 50 kJ/m$^2$.

The tensile strain at break of the proposed polyamide molding composition, determined in accordance with ISO 527, is preferably at least 0.8%, with preference at least 1.0%, and with particular preference at least 1.2%.

The modulus of elasticity of the proposed polyamide molding composition determined in accordance with ISO 527, is at least 24 GPa, preferably at least 26 GPa, and with particular preference at least 27 GPa.

The present invention moreover provides a process for the production of a polyamide molding composition as described above. This process is in particular characterized in that from 35 to 70% by weight of at least one semiaromatic polyamide as component (A) are compounded, in the molten state of component (A), with from 20 to 60% by weight of at least one carbon fiber as component (C), preferably in a screw-based extruder in which component (C) is preferably introduced by way of a side feed, where from 1 to 15% by weight of at least one impact modifier are incorporated as component (B), and/or from 0 to 5% by weight of at least one additive are incorporated as component (D) prior to and/or during and/or after the compounding step.

The present invention further provides an in particular heat-resistant molding made of the polyamide molding composition described above, where said molding is characterized in that the molding is a component from the automobile, mechanical engineering, electronics, and/or electrical sector, in particular is a component selected from the following group: loadbearing and stiffening elements of automobile bodywork, machine parts and crossbeams.

The present invention moreover provides processes for the production of these heat-resistant moldings, and also in particular the use of polyamide molding compositions as defined above, preferably in injection-molding processes, for the production of heat-resistant moldings with use of shot volumes in the range from 50 ml to 10 000 ml, preferably in the range from 500 ml to 5000 ml, and particularly preferably in the range from 2000 ml to 3500 ml. The surface area over which the injected composition is in contact with the injection mold in the parting surface here is preferably in the range from 500 to 10 000 cm$^2$, with preference in the range from 1000 to 7000 cm$^2$, and with particular preference in the range from 3000 to 5000 cm$^2$. The expression "parting surface" means the surface that separates the nozzle side of the mold from the ejector side.

The dependent claims provide further embodiments.

DESCRIPTION OF PREFERRED EMBODIMENTS

Preferred embodiments of the invention are described below with reference to the examples, which are to be interpreted as non-restrictive and serving merely for illustration. The materials used in the inventive examples and comparative examples are listed in Table 1.

TABLE 1

Materials used

| Substance | Trade name | Supplier | rel. viscosity[a] | H$_2$O content [% by wt.] |
|---|---|---|---|---|
| PA 6T/6I (molar ratio 70:30) | — | EMS-CHEMIE AG (CH) | 1.58 | 0.08 |
| PA 6I/6T (molar ratio 67:33) | — | EMS-CHEMIE AG (CH) | 1.52 | 0.05 |
| Carbon fiber | Tenax E-HT C604 6 MM | Toho Tenax Europe GmbH (DE) | — | — |
| Impact modifier | Lotader AX 8840 | Arkema (FR) | — | — |
| Additive mixture[b] | — | Bruggemann (DE) BASF (DE) EMS-CHEMIE AG (CH) | — | — |

[a] Determined in accordance with ISO 307 (0.5% of polyamide in m-cresol at 20° C.); calculation of relative viscosity (RV) from RV = t/t$_0$ with reference to section 11 of the standard ISO 307;
[b] Mixture of heat stabilizers, carbon black masterbatch and nucleating agent.

Compounding of the Molding Compositions

The molding compositions for the inventive examples IE1 to IE3, and also for the comparative examples CE1 and CE2, were produced in a ZE 40Ax33D UT twin-screw extruder from Berstorff. The quantitative proportions stated in Table 2 of the starting materials in percent by weight (% by weight), based on 100% by weight of the entire molding composition, were compounded in the twin-screw extruder. Test samples were injection-molded from the resulting pellets. The properties stated in Table 2 were determined on the test specimens.

TABLE 2

| Compositions | IE1 | IE2 | IE3 | CE1 | CE2 |
|---|---|---|---|---|---|
| *Compositions* | | | | | |
| PA 6T/6I (molar ratio 70:30) | 52.6 | 50.6 | 47.6 | 57 | 67.6 |
| PA 6I/6T (molar ratio 67:33) | — | — | — | 3 | — |
| Carbon fiber | 40 | 40 | 40 | 40 | 30 |
| Impact modifier | 5.0 | 7.0 | 10.0 | — | — |
| Additive mixture | 2.4 | 2.4 | 2.4 | — | 2.4 |
| *Processing [beaker mold]* | | | | | |
| Melt temperature [° C.] | 344 | 343 | 344 | 348 | 344 |
| Max. injection pressure [bar] | 722 | 730 | 739 | 535 | 792 |
| Injection time [s] | 1.1 | 1.1 | 1.1 | 1.1 | 1.1 |
| Cycle time [s] | 71 | 72 | 70 | 68 | 68 |
| Demolding force [N] | 1112 | 1072 | 935 | 3764 | 3035 |
| Demolding noise | (−) | (−) | (−) | (+) | (+) |
| *Properties* | | | | | |
| Dry tensile modulus of elasticity [GPa] | 30.1 | 29.3 | 27.9 | 32.5 | 26.0 |
| Dry tensile strain at break [%] | 1.2 | 1.5 | 1.7 | 0.8 | 1.4 |
| Dry ultimate tensile strength [MPa] | 273 | 261 | 245 | 285 | 295 |
| Dry impact resistance [kJ/m$^2$] | 55 | 61 | 64 | 35 | 47 |
| Dry notched impact resistance [kJ/m$^2$] | 7.3 | 8.6 | 9.8 | 5.5 | 6.4 |
| MVR [340° C., 21.6 kg] | 22 | 18 | 15 | 35 | 65 |
| Moisture content [% by wt.] | 0.03 | 0.04 | 0.02 | 0.03 | 0.05 |

(−): barely discernible,
(+): cracking.

The mechanical data stated in Table 2 were determined in accordance with the following standards.

Tensile Modulus of Elasticity

ISO 527 with tensile testing rate 1 mm/min

ISO tensile specimen, standard: ISO/CD 3167, type A1, 170×20/10×4 mm, temperature 23° C.

Ultimate Tensile Strength and Tensile Strain at Break:

ISO 527 with tensile testing rate 5 mm/min for reinforced materials

ISO tensile specimen, standard: ISO/CD 3167, type A1, 170×20/10×4 mm, temperature 23° C.

Charpy Impact Resistance:

ISO 179-2/1eU (Charpy impact resistance)

ISO test specimen, standard: ISO/CD 179, type 1, 80×10×4 mm, temperature 23° C.

Charpy Notched Impact Resistance:

ISO 179-2/1eU (Charpy impact resistance)

ISO test specimen, standard: ISO 179-1, type 1, 80×10×4 mm, temperature 23° C. MVR:

ISO 1133

Demolding Force:

The demolding force stated in Table 2 was determined by using a beaker mold with stripper plate as ejector. The demolding force corresponds to the measured core stripper force. The external diameter of the circular cylindrical beaker is 60 mm, its wall thickness is 4 mm, and its depth is 95 mm The core of the beaker mold is polished and has no coating. The beaker is connected at the base by way of a sprue gate (120°, 5 mm, 7 mm) In the base there are three holes intended to avoid formation of a vacuum on withdrawal of the core. The mold temperature was set to 160° C. for all of the inventive examples and comparative examples. The other injection-molding parameters are stated in Table 2.

The injection-molding machine used is an Engel E-Victory 120 with cylinder diameter 25 mm and standard three-zone screw.

Injection Profile:

| Injection stroke [mm] | 0 | 28 | 50 | 148 |
|---|---|---|---|---|
| Injection rate [mm/s] | 40 | 40 | 120 | 120 |

The preferred semiaromatic polyamide is a semicrystalline PA 6T/6I (preferably in the ratio 70:30). If however amorphous PA 6T/6I (1:2) is admixed, a significantly higher demolding force has to be exerted (see comparison of CE1 with IE1 to IE3). If the molding composition comprises no impact modifier, it is likewise necessary to exert a significantly higher demolding force (see comparison of IE1 to IE3 with CE2).

What is claimed is:

1. A polyamide molding composition with the following composition:
   (A) 20 to 79% by weight of at least one semiaromatic polyamide in the form of a copolyamide which comprises from 65 to 73 mol % of units composed of hexanediamine and terephthalic acid,
   (B) 1 to 15% by weight of at least one impact modifier,
   (C) 20 to 60% by weight of at least one carbon fiber,
   (D) 0 to 5% by weight of at least one additive,
   where components (A) to (D) give a total of 100% by weight
   wherein the copolyamide is in essence free from aliphatic diacids.

2. The polyamide molding composition as claimed in claim 1, wherein the at least one impact modifier of component (B) is selected from the group consisting of: grafted or ungrafted polyolefin homopolymers; grafted or ungrafted polyolefin copolymers.

3. The polyamide molding composition as claimed in claim 1, wherein the quantity of component (B) present is from 3 to 15% by weight.

4. The polyamide molding composition as claimed in claim 1, wherein the at least one carbon fiber of component (C) has a length from 0.1 to 50 mm and a diameter from 5 to 40 μm.

5. The polyamide molding composition as claimed in claim 1, wherein the at least one additive of component (D)

are selected from the group consisting of: glass beads, glass fibers, mineral powder, UV stabilizers, heat stabilizers, lubricant and mold-release agents, coloring and marking substances, inorganic pigments, organic pigments, IR absorber, antistatic agents, antiblocking agent, nucleating agent, crystallization accelerator, crystallization retarder, chain-extending additives, conductivity additives, crosslinking agent, flame retardant, intumescent agent, viscosity modifiers, foreign polymers, and mixtures thereof, and/or
wherein the at least one additive of component (D) comprise a proportion of at most 1% by weight of polycarbodiimides.

6. The polyamide molding composition as claimed in claim 1, wherein the proportion of the at least one additive of component (D) is in the range from 0.05 to 5% by weight.

7. The polyamide molding composition as claimed in claim 1, wherein a demolding force that has to be exerted for the removal of a beaker-shaped injection molding produced therefrom of external diameter 60 mm, wall thickness 4 mm, and depth 95 mm is less than 3000 N.

8. The polyamide molding composition as claimed in claim 1, wherein impact resistance measured in accordance with ISO 179-1 is at least 35 kJ/m$^2$, and/or
wherein the modulus of elasticity determined in accordance with ISO 527 is at least 24 GPa.

9. The polyamide molding composition as claimed in claim 1, wherein component (A) is a semicrystalline polyamide selected from the following group: 6T/6I, 6T/10T, 6T/12T, 6T/10I, 6T/12I, 6T/6, 6T/10, 6T/12, or a mixture thereof.

10. The polyamide molding composition as claimed in claim 1, wherein the at least one impact modifier of component (B) is selected from the group consisting of: grafted or ungrafted polyolefin homopolymers; grafted or ungrafted polyolefin copolymers in the form of grafted propylene/ethylene-butylene copolymers; and mixtures thereof.

11. The polyamide molding composition as claimed in claim 1, wherein the at least one impact modifier of component (B) comprises a copolymer of ethylene and glycidyl methacrylate.

12. The polyamide molding composition as claimed in claim 1, wherein the quantity of component (B) present is 6 to 11% by weight.

13. The polyamide molding composition as claimed in claim 1, wherein the at least one carbon fiber of component (C) has a length from 0.1 to 50 mm and of diameter from 5 to 40 µm, based on PAN fibers, on pitch fibers, or on cellulose fibers.

14. The polyamide molding composition as claimed in claim 1, wherein the proportion present in the polyamide molding composition of the at least one carbon fiber of component (C) is more than 35 to 45% by weight.

15. The polyamide molding composition as claimed in claim 1, wherein the at least one carbon fiber of component (C) has been coated, and the coating is selected from a coating material based on epoxy, polyurethane, polyimide, or polyamide, or the at least one carbon fiber of component (C) is uncoated and plasma-treated.

16. The polyamide molding composition as claimed in claim 1, wherein the at least one additive of component (D) is selected from the group consisting of: glass beads, glass fibers with round or flat cross section, mineral powder, UV stabilizers, heat stabilizers, lubricant and mold-release agents, coloring and marking substances, inorganic pigments, organic pigments, IR absorber, antistatic agents, antiblocking agent, nucleating agent, crystallization accelerator, crystallization retarder, chain-extending additives, conductivity additives, crosslinking agent, flame retardant, intumescent agent, viscosity modifiers, foreign polymers, and mixtures thereof, and/or
wherein the at least one additive of component (D) is entirely free from polycarbodiimides.

17. The polyamide molding composition as claimed in claim 1, wherein the proportion of the at least one additive of component (D) is in the range from 0.15 to 1% by weight.

18. The polyamide molding composition as claimed in claim 1, wherein the demolding force that has to be exerted for the removal of a beaker-shaped injection molding produced therefrom of external diameter 60 mm, wall thickness 4 mm, and depth 95 mm is less than 1500 N.

19. The polyamide molding composition as claimed in claim 1, wherein impact resistance measured in accordance with ISO 179-1 is 50 kJ/m$^2$, and/or
wherein the tensile strain at break determined in accordance with ISO 527 is at least 1.2%, and/or
wherein the modulus of elasticity determined in accordance with ISO 527 is at least 27 GPa.

20. The polyamide molding composition as claimed in claim 1, wherein a demolding force that has to be exerted for the removal of a beaker-shaped injection molding produced therefrom of external diameter 60 mm, wall thickness 4 mm, and depth 95 mm is less than 3000 N, and is not more than 4 times the demolding force for a composition made of 47.625% by weight of PA 6T/6I, having a molar ratio 70:30, a melting point 325° C., a relative viscosity $\eta_{rel}$ =1.58 determined in accordance with ISO 307 at 0.5% in m-cresol at 20° C., 0.04% by weight water content, a melt volume flow rate (MVR) 144 cm$^3$/10 min in accordance with ISO 1133 at 340° C. for 21.6 kg, 50% by weight of glass fibers of diameter 10 µm and average length 4.5 mm with size made of 0.1% by weight, based on the total mass of the glass fiber, of a hydrolyzed aminosilane and 0.5% by weight, based on the total mass of glass fiber, of one third of an aqueous polyurethane dispersion and two thirds of a polyfunctional (meth)acrylate oligomer, 0.2% by weight of kaolin, 0.175% by weight of a CuI/KI stabilizer system, and 2.0% by weight of a carbon black masterbatch based on PA66.

21. The polyamide molding composition as claimed in claim 1, wherein component (B) is the impact modifier selected from the group consisting of: grafted or ungrafted polyolefin homopolymers; maleic-anhydride-grafted ethylene-propylene/ethylene-butylene copolymer; and mixtures thereof.

22. The polyamide molding composition as claimed in claim 1, wherein
the demolding force for a beaker-shaped injection molding produced therefrom of external diameter 60 mm, wall thickness 4 mm, and depth 95 mm is not more than twice, the demolding force for a composition made of 47.625% by weight of PA 6T/6I, having a molar ratio 70:30, a melting point 325° C., a relative viscosity $\eta_{rel}$ =1.58 determined in accordance with ISO 307 at 0.5% in m-cresol at 20° C., 0.04% by weight water content, a melt volume flow rate (MVR) of 144 cm$^3$/10 min in accordance with ISO 1133 at 340° C. for 21.6 kg, 50% by weight of glass fibers of diameter 10 µm and average length 4.5 mm with size made of 0.1% by weight, based on the total mass of the glass fiber, of a hydrolyzed aminosilane and 0.5% by weight, based on the total mass of glass fiber, of one third of an aqueous polyurethane dispersion and two thirds of a polyfunctional (meth)acrylate oligomer, 0.2% by weight of kaolin, 0.175% by weight of a CuI/KI stabilizer system, and 2.0% by weight of a carbon black masterbatch based on PA66.

23. A polyamide molding composition with the following composition:
(A) 20 to 79% by weight of at least one semiaromatic polyamide in the form of a copolyamide which comprises from 50 to 80 mol % of units composed of hexanediamine and terephthalic acid,
(B) 1 to 15% by weight of at least one impact modifier,
(C) 20 to 60% by weight of at least one carbon fiber,
(D) 0 to 5% by weight of at least one additive,
where components (A) to (D) give a total of 100% by weight,
wherein the copolyamide of component (A) comprises from 65 to 73 mol % of units composed of hexanediamine and terephthalic acid, where the copolyamide is free from adipic acid.

24. A polyamide molding composition with the following composition:
(A) 20 to 79% by weight of at least one semiaromatic polyamide in the form of a copolyamide which comprises from 50 to 80 mol % of units composed of hexanediamine and terephthalic acid,
(B) 1 to 15% by weight of at least one impact modifier,
(C) 20 to 60% by weight of at least one carbon fiber,
(D) 0 to 5% by weight of at least one additive,
where components (A) to (D) give a total of 100% by weight,
wherein component (A) comprises a 6T/6I copolyamide which comprises more than 50 mol % of 6T units.

25. The polyamide molding composition as claimed in claim 24, wherein the copolyamide of component (A) comprises from 60 to 75 mol % of units composed of hexanediamine and terephthalic acid.

26. The polyamide molding composition as claimed in claim 24, wherein the copolyamide of component (A) comprises from 65 to 73 mol % of units composed of hexanediamine and terephthalic acid, where the copolyamide is in essence free from aliphatic diacids.

27. The polyamide molding composition as claimed in claim 24, wherein component (A) comprises a 6T/6I copolyamide which comprises more than 65 mol % of 6T units.

28. A process for the production of a polyamide molding composition as claimed in claim 1, wherein from 20 to 79% by weight of at least one semiaromatic polyamide as component (A) are compounded, in the molten state of component (A), with from 20 to 60% by weight of at least one carbon fiber as component (C), where from 1 to 15% by weight of at least one impact modifier are incorporated as component (B), and from 0 to 5% by weight of at least one additive are incorporated as component (D) prior to and/or during and/or after the compounding step
wherein the copolyamide of component (A) comprises from 65 to 73 mol % of units composed of hexanediamine and terephthalic acid, where the copolyamide is in essence free from aliphatic diacids.

29. A heat-resistant molding made of a polyamide molding composition as claimed in claim 1, wherein the molding is a component from automobile, mechanical engineering, electronics, and/or electrical sector.

30. A method of using a polyamide molding composition as claimed in claim 1 in injection-molding processes for the production of heat-resistant moldings with use of shot volumes in the range from 50 ml to 10 000 ml.

31. The method as claimed in claim 30, wherein the surface area over which the injected composition is in contact with the parting surface of the injection mold is in the range from 500 to 10 000 $cm^2$.

32. A process according to claim 28, wherein from 20 to 79% by weight of at least one semiaromatic polyamide as component (A) are compounded, in the molten state of component (A), with from 20 to 60% by weight of at least one carbon fiber as component (C), in a screw-based extruder in which component (C) is introduced by way of a side feed, where from 1 to 15% by weight of at least one impact modifier are incorporated as component (B), and from 0 to 5% by weight of at least one additive are incorporated as component (D) prior to and/or during and/or after the compounding step.

33. A heat-resistant molding made of a polyamide molding composition as claimed in claim 29, wherein the molding is a component in the form selected from the following group: loadbearing and stiffening elements of automobile bodywork, machine parts and crossbeams.

34. A method of using a polyamide molding compositions as claimed in claim 1 in injection-molding processes for the production of heat-resistant moldings with use of shot volumes in the range from 2000 ml to 3500 ml.

35. The method as claimed in claim 30, wherein the surface area over which the injected composition is in contact with on the parting surface of the injection mold is in the range from 3000 to 5000 $cm^2$.

36. The polyamide molding composition as claimed in claim 23, wherein component (A) is a semicrystalline polyamide selected from the following group: 6T/6I, 6T/10T, 6T/12T, 6T/10I, 6T/12I, 6T/610, 6T/612, 6T/6, 6T/10, 6T/12, or a mixture thereof.

* * * * *